United States Patent
Agarwal

(10) Patent No.: US 6,995,592 B2
(45) Date of Patent: Feb. 7, 2006

(54) METHOD AND SYSTEM FOR GENERATING VARIABLE FREQUENCY CYCLIC WAVEFORMS USING PULSE WIDTH MODULATION

(75) Inventor: Nitin Agarwal, Meerut (IN)

(73) Assignee: STMicroelectronics Pvt. Ltd., Uttar Pradesh (IN)

( * ) Notice: Subject to any disclaimer, the term of this patent is extended or adjusted under 35 U.S.C. 154(b) by 29 days.

(21) Appl. No.: 10/704,210

(22) Filed: Nov. 6, 2003

(65) Prior Publication Data

US 2005/0099217 A1    May 12, 2005

(51) Int. Cl.
*H03K 3/017* (2006.01)

(52) U.S. Cl. .................................... 327/172; 327/175

(58) Field of Classification Search ............... 327/113, 327/182, 172–175; 331/108 D, 158
See application file for complete search history.

(56) References Cited

U.S. PATENT DOCUMENTS 6,271,733 B1 *  8/2001  Alzu et al. .............. 331/108 D
6,396,317 B1 *  5/2002  Roller et al. ................ 327/113

* cited by examiner

*Primary Examiner*—Dinh T. Le
(74) *Attorney, Agent, or Firm*—Hogan & Hartson L.L.P.; William J. Kubida, Esq.; Carol W. Burton, Esq.

(57) ABSTRACT

A method and system for generating variable frequency cyclic waveforms using pulse width modulation (PWM) to provide adjustable precision frequency and enhanced resolution is disclosed. The technique includes a plurality of sets of duty cycle values, each set corresponding to the desired waveform profile at a given frequency, coupled with a mechanism for applying a selected duty cycle for a variable number of PWM cycles, to achieve an adjustable fine resolution of the waveform frequency.

13 Claims, 10 Drawing Sheets

Basic Algorithm Flowchart

METHOD AND SYSTEM FOR GENERATING VARIABLE FREQUENCY CYCLIC WAVEFORMS USING PULSE WIDTH MODULATION

FIELD OF THE INVENTION

This invention relates to an improved method and system for generating variable frequency cyclic waveforms using pulse width modulation (PWM) for providing adjustable precision frequency and enhanced resolution.

BACKGROUND OF THE INVENTION

Different applications require a precisely defined time varying cyclic signal. To get the desired waveforms present micro processors/computers based solutions generate a PWM based output. These solutions vary the value stored in the auto reload registers (generally referred as ARTARR). Since the frequency is varied using only one variable i.e., the ARTARR value; such variation in the ARTARR value limits the precision that can be achieved.

The output frequency FPWM is calculated in an 8-bit micro controller/computer by following formula. Depending on the architecture of PWM Auto reload timer, this is done for 8-bit PWMART.

$$F_{PWM} = F_{CPU}/(256 - ARTARR \text{ value}) \quad (1)$$

Similarly for a 16-micro controller/processor/computer 256 may be replaced by 65536 in the above formula. It also depends on which peripheral is used and so on. In an 8-bit micro controller/processor/computer an ARTARR register will have 8 single bit registers that allows it to store values between 0 and 255.

The output frequency generated based on above calculation has certain limitations, for example, such computation of the output frequency provides only one variable to control the frequency precision (if $F_{CPU}$ is fixed). Further the output frequency resolution is also limited.

Thus it has been observed that there is a need to develop a method and system that provides an enhance resolution and adjustable precision value of a waveform.

SUMMARY OF THE INVENTION

An object of the present invention is to obviate the above drawbacks by providing a plurality of sets of duty cycle values, each set corresponding to the desired waveform profile at a given frequency, coupled with a mechanism for applying a selected duty cycle for a variable number of PWM cycles, to achieve an adjustable fine resolution of the waveform frequency.

To achieve this objective, the present invention provides an improved method for generating variable frequency cyclic waveforms using Pulse Width Modulation (PWM) for providing adjustable precision frequency and enhanced resolution. In one embodiment of the present invention, the technique includes the steps of providing one or more sets of duty cycle values corresponding to the desired waveform amplitude profile, each set having a corresponding number of samples per cycle, generating a PWM waveform, and selecting one of the duty cycle sets. Thereafter, for the selected duty cycle set, a duty cycle value is obtained for each PWM waveform cycle, the duty cycle is maintained for a specified number of PWM cycles, and the next duty cycle is obtained from the selected set at the end of the specified number of PWM cycles. These steps for the selected duty cycle step are repeated for the number of samples corresponding to the selected set. The steps are further repeated to generate multiple waveform cycles. Additional steps include selecting a different combination of duty cycle set and/or specified number of PWM cycle to achieve a different desired waveform frequency whenever required and filtering the output wave to get a desired waveform.

The sets of duty cycle values corresponding to the desired waveform amplitude profile may be provided by means of one or more look up tables. The filtering is preferably achieved using a low pass filter.

The present invention further provides an improved system for generating variable frequency cyclic waveforms using Pulse Width Modulation (PWM) for providing adjustable resolution. A preferred embodiment includes:

a) storage means for storing one or more sets of duty cycle values corresponding to the desired waveform amplitude profile, each set having a corresponding number of sample per cycle, b) a PWM waveform generator for generating a PWM waveform, c) selection means for selecting one of said sets of duty cycles, d) means for obtaining the duty cycle of each cycle of said PWM waveform from the selected set of duty cycles, e) means for maintaining the duty cycle for a specified number of PWM cycles, f) means for obtaining next duty cycle from said selected set at the end of said specified number of PWM cycles, g) means for repeating steps d), e) and f) for the number of samples corresponding to said selected act, h) means for continuing step g) to generate multiple waveform cycles, i) selection means for selecting a different combination of duty cycle set and/or specified number of PWM cycle to achieve a different desired waveform frequency whenever required, and;

j) a filter to eliminate undesired frequency elements from the generated wave.

In a preferred embodiment, the storage means is a memory device. The preferred memory contains one or more lookup tables that store the sets of duty cycle values corresponding to the desired waveform amplitude profile each set having a corresponding number of sample per cycle. Preferably, the filter is a low pass filter.

BRIEF DESCRIPTION OF THE DRAWINGS

The invention will now be described with reference to the drawings.

DETAILED DESCRIPTION

Figure 1:
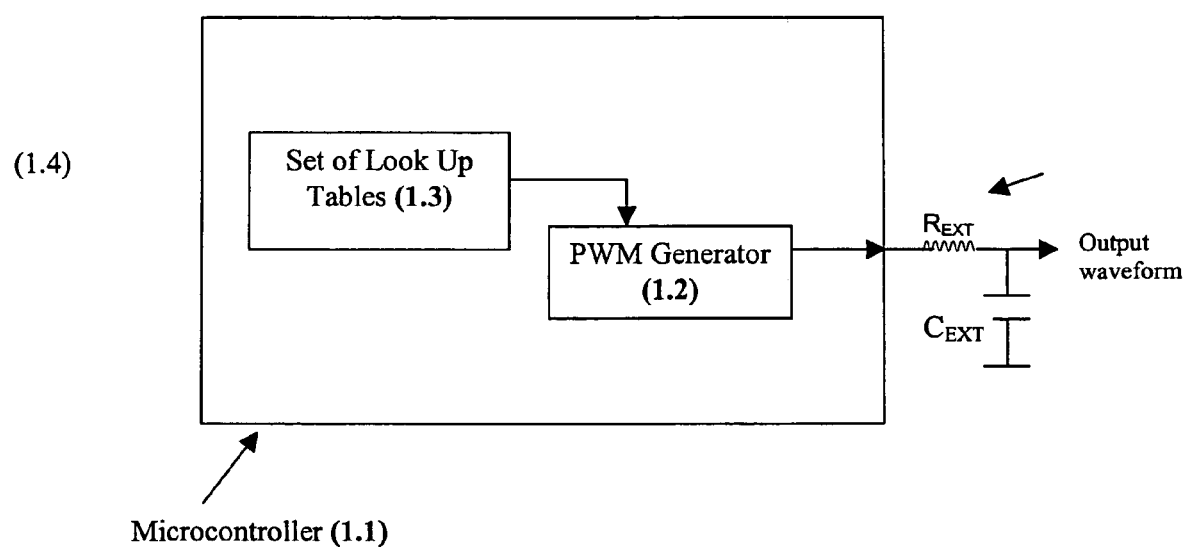
FIG. 1 shows a block diagram of an 8-bit microcontroller including algorithm for generating a waveform in accordance with the present invention.

FIG. 1 shows a block diagram of an 8-bit microcontroller 1.1 for generating a waveform in accordance with the present invention. The microcontroller has a PWM generator 1.2 that receives the required duty cycle values from a set of Look Up Tables 1.3. The generated PWM output is filtered by RC filtering element 1.4, which filters out the undesired high frequency elements from the generated waveform. The microcontroller uses on-chip component and therefore does not require external hardware to get an output waveform of the desired frequency.

To compute the frequency of the waveform, the PWM generator 1.2 provides a PWM cycle counter and a sample counter as control variables for adjusting the frequency. The output frequency is calculated using formula given below.

$$F_{gen} = F_{PWM}/(\text{Total No. of Counts in the counter} \times \text{Total Number of Samples}) \quad (1)$$

$F_{PWM}$ is the frequency computed according to relation (1). To generate the required waveform, a Look Up Table is selected, the counter is set to a known value and the duty cycle value for each sample is retrieved from the Look Up Table. The $F_{gen}$ frequency can be varied by either varying $F_{PWM}$ by changing ARTARR value in relation (1) and/or by changing the counter value and/or by changing the number of samples. The process of generating waveform according to the present invention is illustrated using the flow charts shown in FIGS. 2A & 2B.

These duty cycle values for the output waveform are already stored in Look Up Tables in FLASH memory corresponding to number of samples in one cycle of the wave. The duty cycle values are changed after a number of overflow cycles, corresponding to the count value. These duty cycle values are added to the desired average value for the positive half cycle of sine wave and subtracted from it for the negative half cycle of the sine wave.

The wave frequency is given by:

$$F_{gen} = 1/(t_{PWM} * \text{No. Of Samples} * \text{COUNTER})$$

wherein the tPWM is inverse of the $F_{PWM}$. No. of samples is the total number of the samples in the look up table that are to be used for generation of the wave pattern. COUNTER is the number of samples with a constant duty cycle.

If $F_{CPU}$ is 4 MHz and ARTARR value is 56, the $t_{PWM}$ is 50 us. If the number of samples in a cycle of wave is 40 and "COUNTER" is 10, then the $F_{gen}$ will be:

$$F_{gen} = 1/(50 \text{ us} * 40 * 10) = 50 \text{ Hz}.$$

If ARTARR value is changed to 57, the $t_{PWM}$ will be changed to 49.75 us. So, $F_{gen}$ will be:

$$F_{gen} = 1/(49.75 \text{ us} * 40 * 10) = \sim 50.25 \text{ Hz}.$$

In this manner, the resolution of wave is ~0.25 Hz.

If ARTARR value is changed to 36, and $f_{CPU}$ is 4 MHz, the $t_{PWM}$ is 55 us. If the number of samples in a cycle of wave is 52 and "COUNTER" is 7, the $F_{gen}$ will be:

$$F_{gen} = 1/(55 \text{ us} * 52 * 7) = \sim 49.95 \text{ Hz}.$$

By this way, the resolution of wave has been improved. Now the resolution of wave is ~0.05 Hz.

The change in $t_{PWM}$ can only be done by varying the ARTARR value if $F_{CPU}$ is fixed. The minimum change in ARTARR that can be done is 1. So, the minimum change in $t_{PWM}$ is $t_{CPU}$.

Figure 2A:
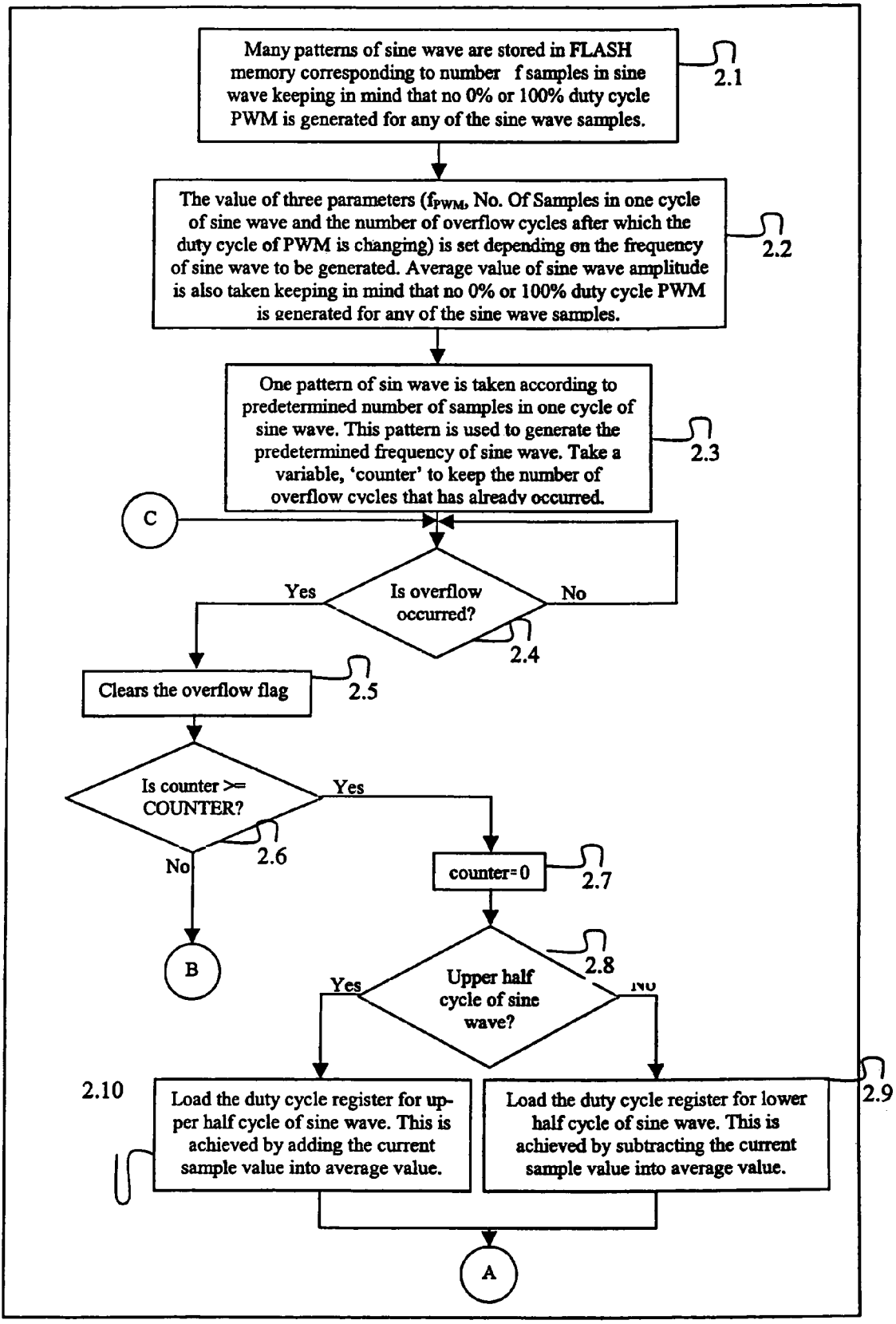
FIGS. 2A & 2B show flow diagram for basic algorithm to generate the waveform according to the present invention.
Figure 2B:
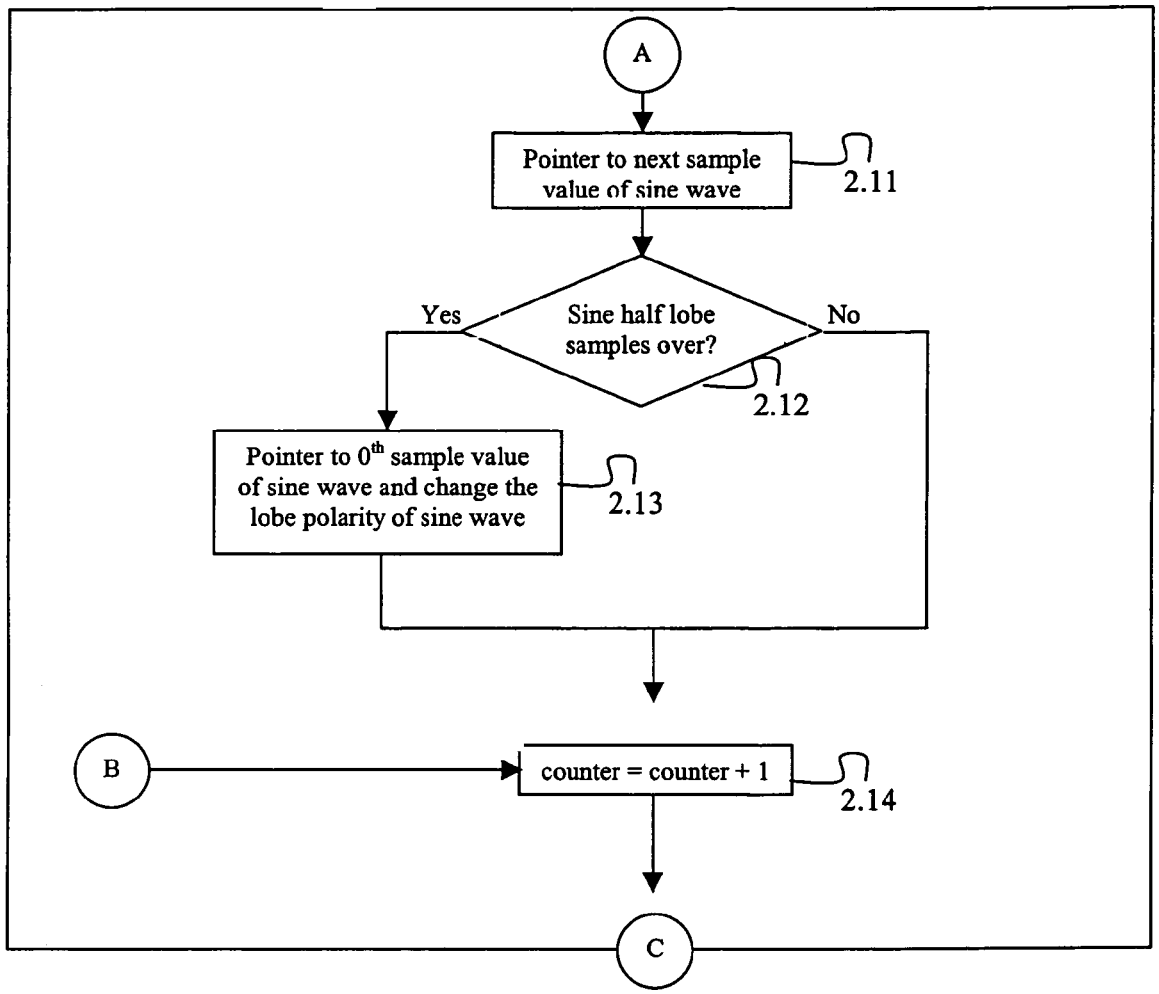

FIGS. 2A & 2B show flow diagram for the algorithm to generate the wave according to the present invention. In the step 2.1 many duty cycle patterns of waveform are stored in FLASH memory corresponding to a desired number of samples in one cycle ensuring that no 0% or 100% duty cycle PWM is generated for any PWM sample.

In step 2.2, the value of $F_{PWM}$, number of samples in one cycle of wave and the number of overflow cycles after which the duty cycle of PWM changes, are set depending on the desired frequency of the output waveform. The wave amplitude is selected so that 0% or 100% duty cycle PWM is not generated for any of the wave samples.

In step 2.3 a cycle of the waveform is generated according to the number of samples for one cycle of the output waveform. A variable, 'counter' is used to count the number of overflow cycles that have occurred.

In step 2.4 it is checked if an overflow has occurred. When the overflow has occurs then the over flow flag is cleared in the step 2.5.

In step 2.6 it is checked if the counter value is less than the maximum set value if not then the control is transferred to step 2.14 (B) in which the counter value is incremented by one and the control is returned to step 2.4 (C) again. If the counter value is equal to the set maximum counter value then the counter value is reset to zero in step 2.7. Negative or positive half of the wave is selected in step 2.8.

For the positive half of the wave a duty cycle register is loaded by a value equal to the sum of the sample value and the average amplitude of the wave in step 2.10. Whereas for the negative half of the wave duty cycle register is loaded by a value equal to the negative sum of the sample value and the average amplitude of the wave in step 2.11.

Then next step 2.11-sample value is selected. It is then checked if pointer is pointing at the last sample value, if not then the control is transferred to step 2.14 and then subsequently to 2.4 (C), if yes then the pointer is set to zeroth value and the wave polarity is changed in step 2.13.

The counter value is then incremented by one in step 2.14 and the whole cycle is repeated for the next half of the cycle to achieve a continuous wave pattern.

Table 1 shows a chart showing an experimental implementation. A person skilled in the art will appreciate that even higher resolution can be achieved by addition one or more additional counter/s.

TABLE 1

| $t_{PWM}$ (us) | No of Samples in a cycle of sine wave | "COUNTER" | $f_{SINE}$ (Hz) | Resolution (Hz) |
|---|---|---|---|---|
| 56.25 | 32 | 11 | 50.5051 | — |
| 59 | 48 | 7 | 50.4439 | 0.0612 |
| 62 | 32 | 10 | 50.4032 | 0.0407 |
| 50.75 | 48 | 8 | 50.3221 | 0.0811 |
| 59.25 | 48 | 7 | 50.2311 | 0.0910 |
| 54.75 | 52 | 7 | 50.1781 | 0.0530 |
| 52 | 48 | 8 | 50.0801 | 0.0980 |

Figure 3:
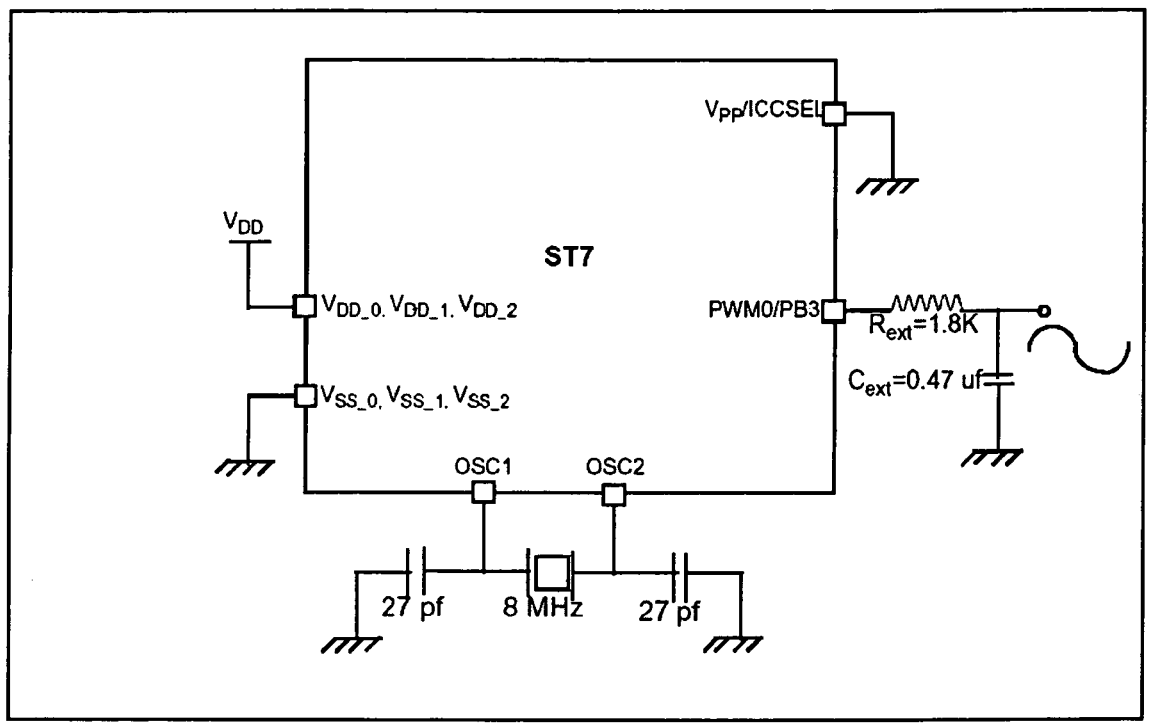
FIG. 3 shows an implementation of this invention for generating variable frequency with high-resolution wave pattern using an ST72F321 microcontroller.

FIG. 3 shows an implementation of this invention for generating variable frequency with high-resolution wave pattern using an ST72F321 microcontroller. The PWM0 channel is used to generate the PWM. The Rext used is 1.8K and Cext is 0.47 uf. The values of Rext and Cext decides the filtering level. The selected crystal for this example has a frequency of 8 MHz which gives fCPU=4 MHz because the PLL is disabled and slow mode is not selected. It gives the fCOUNTER=4 MHz for the reset value of Counter Clock Control bits in ARTCSR register.

The ST7 PWMART consists of an 8-bit auto reload counter with compare/capture capabilities and a 7-bit clock prescaler. The free running 8-bit counter is fed by the output of the prescaler, and is incremented on every rising edge of the clock signal. It is possible to read or write the contents of the counter on the fly by reading or writing the Counter Access register (ARTCAR). When a counter over-flow occurs, the counter is automatically reloaded with the contents of the ARTARR register (the prescaler is not affected).

The counter clock frequency is given by:

$$f_{COUNTER} = \frac{f_{INPUT}}{2^{CC[2:0]}}$$

The timer counter's input clock (fINPUT) feeds the 7-bit programmable prescaler, which selects one of the 8 available taps of the prescaler, as defined by CC[2:0] bits in the ARTCSR Register. Thus the division factor of the prescaler can be set to 2n (where n=0, 1, 2 . . . 7). This fINPUT frequency source is selected through the EXCL bit of the ARTCSR register and can be either the fCPU or an external input frequency fEXT. The clock input to the counter is enabled by the TCE (Timer Counter Enable) bit in the ARTCSR register. When TCE is reset, the counter is stopped and the prescaler and counter contents are frozen. When TCE is set, the counter runs at the rate of the selected clock source.

The timer compare function is based on four different comparisons with the counter (one for each PWMX output). Each comparison is made between the counter value and an output compare register (OCRx) value. This OCRx register can not be accessed directly, it is loaded from the duty cycle register (PWMDCRx) at each overflow of the counter.

This double buffering method avoids glitch generation when changing the duty cycle on the fly.

The PWM mode allows up to four Pulse Width Modulated signals to be generated on the PWMx output pins with minimum core processing overhead. This function is stopped during HALT mode.

Figure 4:
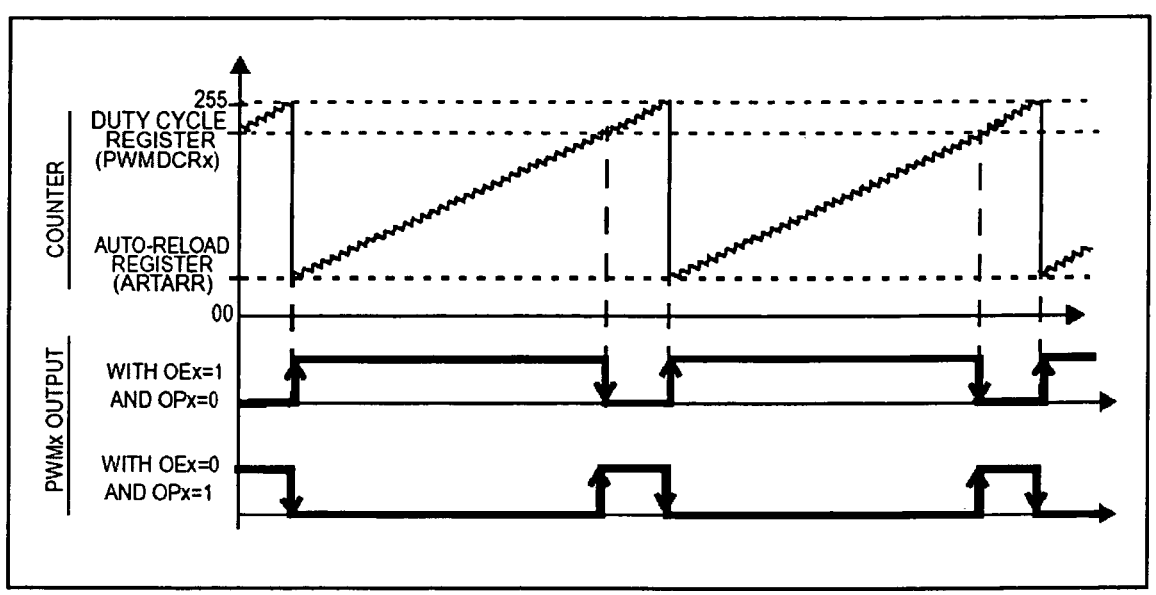
FIG. 4 shows PWMx output and the counter signal.

As shown in FIG. 4 Each PWMx output signal can be selected independently using the corresponding OEx bit in the PWM Control register (PWMCR). When this bit is set, the corresponding I/O pin is configured as output push-pull alternate function. The PWM signals all have the same frequency which is controlled by the counter period and the ARTARR register value.

$$f_{PWM} = \frac{f_{COUNTER}}{256 - ARTARR}$$

When a counter overflow occurs, the PWMx pin level is changed depending on the corresponding OPx (output polarity) bit in the PWMCR register. When the counter reaches the value contained in one of the output compare register (OCRx) the corresponding PWMx pin level is restored.

Note that the reload values will also affect the value and the resolution of the PWM output signal duty cycle. To obtain a signal on a PWMx pin, the contents of the OCRx register must be greater than the contents of the ARTARR register.

The resolution for the PWMx duty cycle is:

$$Resolution = \frac{1}{256 - ARTARR}$$

On overflow, the OVF flag of the ARTCSR register is set and an overflow interrupt request is generated if the overflow interrupt enable bit, OIE, in the ARTCSR register, is set. The OVF flag must be reset by the user software. This interrupt is used as a time base in the application.

For sinewave generation the initial value of the PWM-DCR0 register is initialized to obtain a 50% duty cycle. The number of samples in a cycle of the sinewave is defined and the counter reload value (ARTARR) is initialized first to start sinewave generation. More than 18 samples in a sinewave cycle should be selected to generate a sinewave with Total Harmonic Distortion of less than 5%. Depending on the number of samples in a sinewave cycle, the duty cycle register (PWMDCR0) is modified, taking care that no 0% and 100% PWM is generated for any of the sinewave samples (because the PWM duty cycle must be between ~99% to ~1% to generate an undistorted sinewave). The PWM duty cycle is changed after a certain number ("COUNTER") of overflow cycles. The sinewave frequency depends on three parameters, the PWM frequency (fPWM), the number of samples in a sinewave cycle and the number of overflow cycles after which the PWM duty cycle changes ("COUNTER").

Figure 5:
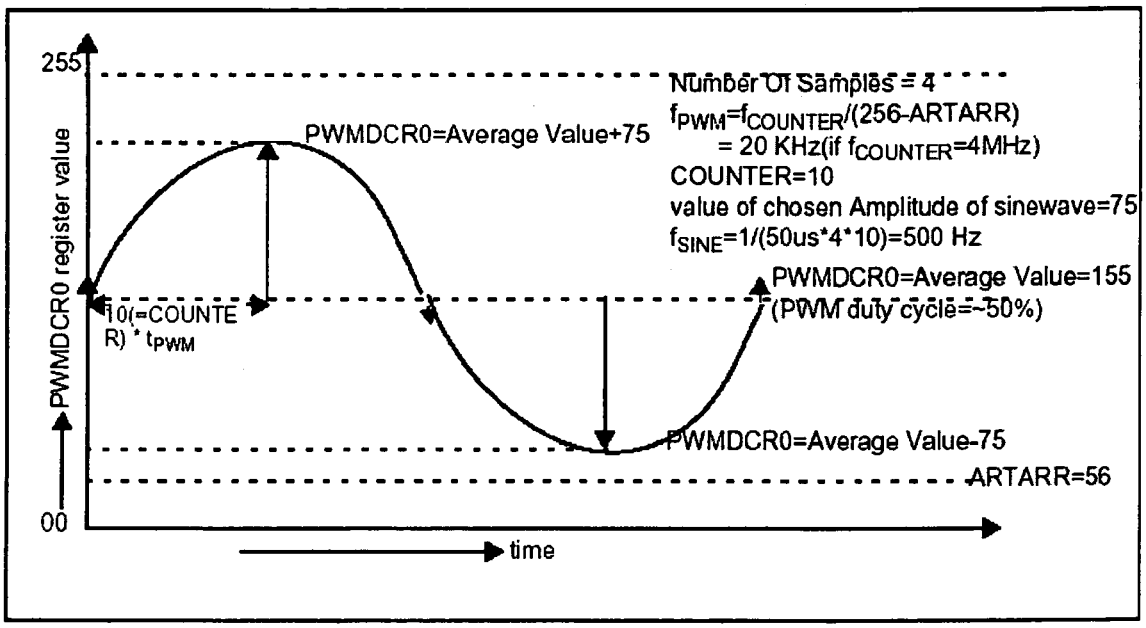
FIG. 5 shows the sinewave with sample points.

Referring to FIG. 5 the sinewave frequency is given by:

$$f_{SINE} = \frac{1}{t_{PWM} * number\ of\ samples * COUNTER}$$

This PWM signal must be filtered with an external RC network selected for the filtering level required to generate a sinusoid.

As stated earlier the sinewave frequency depends on three factors, $t_{PWM}$, the number of samples in a sinewave cycle and the "COUNTER" value. The reduction of the $t_{PWM}$ can only be changed $t_{PWM}$ by varying the ARTARR value. The minimum change possible to ARTARR is 1. So, the minimum change in $t_{PWM}$ is COUNTER. For example:

If $f_{COUNTER}$ is 4 MHz and ARTARR value is 56, then $t_{PWM}$ is 50 us. If the number of samples in a sinewave cycle is 40 and COUNTER is 10, $f_{SINE}$ will be 50 Hz. If you change the ARTARR value to 57, $t_{PWM}$ will change to 49.75 us. $f_{SINE}$ will be ~50.25 Hz (assuming the number of samples and COUNTER value are fixed), providing the resolution is ~0.25 Hz.

Further improvement is possible by changing ARTARR=36, COUNTER=7 and setting the number of samples in a sinewave cycle to 52. Assuming $f_{COUNTER}$ is still 4 MHz, $t_{PWM}$ will be 55 us. In this case $f_{SINE}$ will be 49.95 Hz, which improved resolution by ~0.05 Hz.

FIGS. 6, 7, 8 and 9 are figures illustrating an example for generating a sine wave adjustable from 45 Hz to 65 Hz with 0.1 Hz resolution using ST72F321 microcontroller based according to the present invention.

Figure 6:
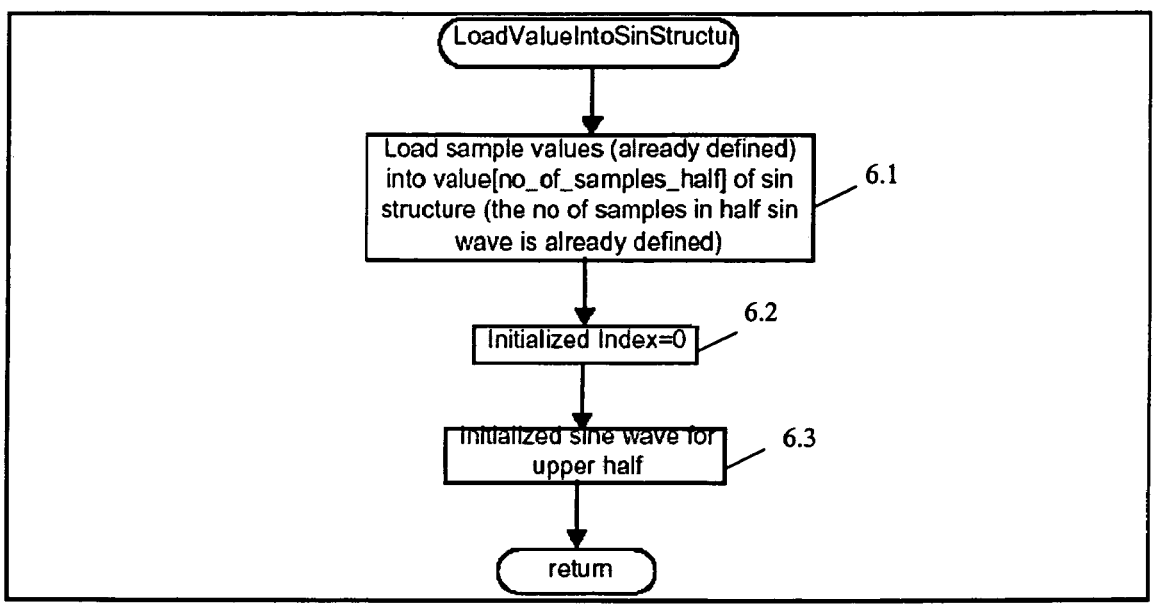
FIG. 6 shows the flow chart for loading the sine structure.

FIG. 6 shows the flow chart for loading the sine structure. The sin structure has the three user defined datatypes for storing sinewave patterns depending on the number of samples in a sinewave cycle (6.1), the "index" which is used for counting the current sinewave sample and is initialized to '0' (6.2) and another datatype which is used to indicate whether the current sample is related to the upper half or lower half of the sinewave (6.3). Depending on the number of samples in a sinewave cycle, sample values are initialized for the sinewave envelope (X(n)=A sin((2*pi*n)/N)). where A is the sinewave amplitude, pi is 3.1416, n is the nth sample of the sinewave, N is the number of samples in a sinewave cycle. The value of A should be such that no 0% or 100% duty cycle is generated for any of the sinewave samples.

There are other define types for the sinewave frequency from 45 to 65 Hz with a resolution of less than 0.1 Hz. These define types contain five parameters: the "no_of_samples_half" for defining the number of samples in half a sinewave cycle, "COUNTER" value which defines the number of overflow cycles after which the PWM duty cycle changes, initialization value of ARTARR for fPWM, initialization value of PWMDCR0 a 50% duty cycle, and "AVERAGE_AMP" to define the average sinewave amplitude. A sinewave with a resolution of less than 0.1 Hz is obtained by varying the "no_of_samples_half", the "COUNTER" value and ARTARR. The average sinewave amplitude is also software configurable by the "AVERAGE_AMP" parameter. It should be noted that the value of A and the value of the "AVERAGE_AMP" is chosen in such a way that no 0% or 100% duty cycle is generated for any of the sinewave samples.

Figure 7:
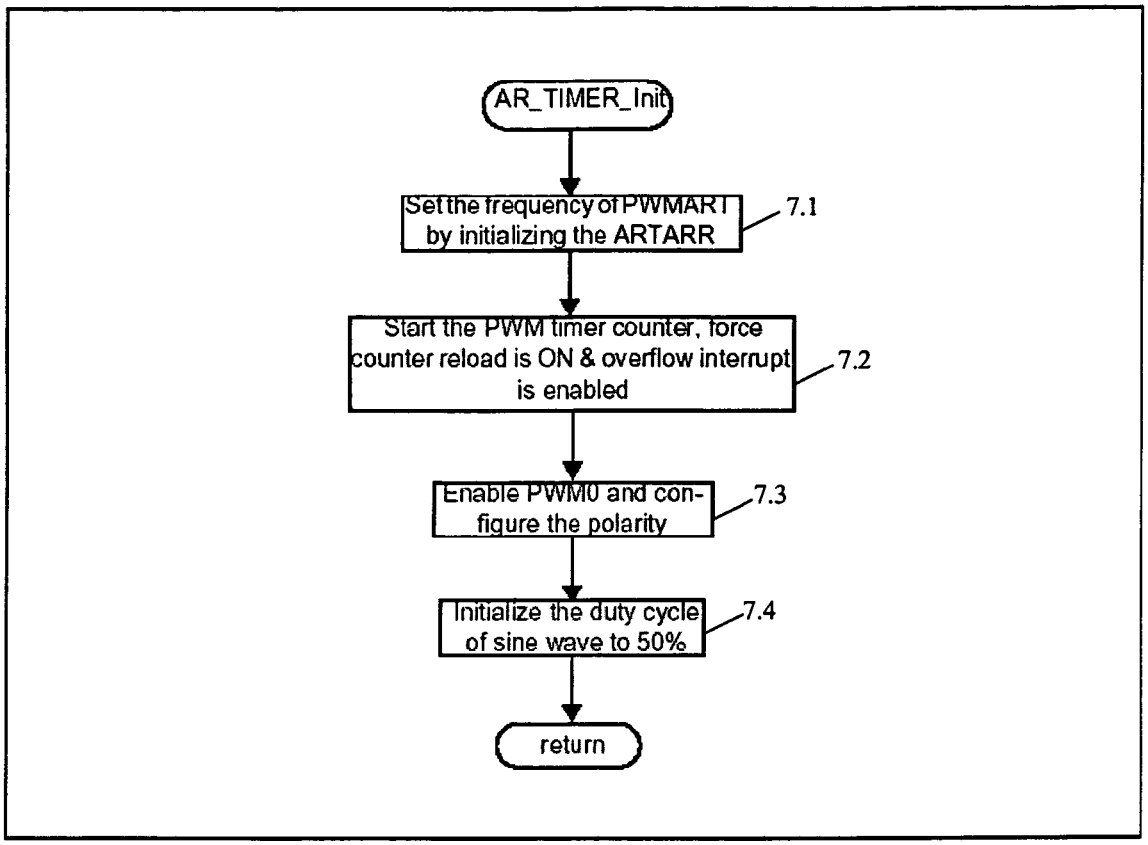
FIG. 7 shows the flowchart for initialization of the PWMART timer counter.

FIG. 7 shows the flowchart for the initialization of the PWMART timer counter. The instructions flow in following order.

Writing to the ARTARR register to set the PWM frequency (7.1).

Setting the FCRL (Force Counter Re-Load), the TCE (Timer Counter Enable) and OIE (Overflow Interrupt Enable) bits in the ARTCSR register (7.2).

In this case, the $f_{INPUT}$ is CPU clock ($f_{CPU}$) and $f_{COUNTER}=f_{INPUT}$ (=4 MHz in this particular application).

Enable PWM0 and configure the polarity in the PWMCR register (7.3).

Initialize the PWMDCR0 register to define the PWM duty cycle at 50% (7.4).

Figure 8:
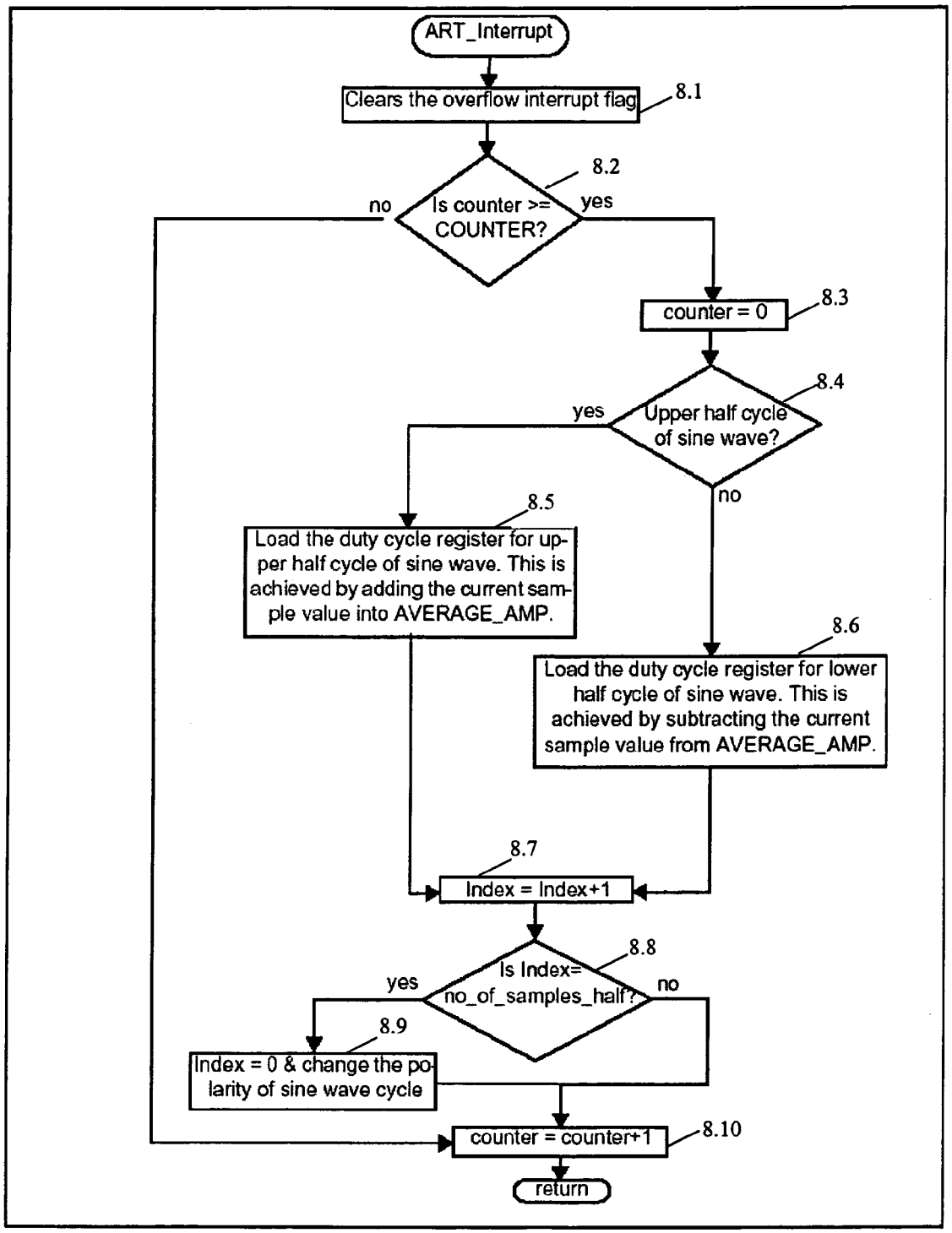
FIG. 8 shows a flowchart describing the interrupt service routine for the PWMART interrupt.

FIG. 8 shows a flowchart describing the interrupt service routine for the PWMART interrupt. Every time an overflow occurs, an interrupt is generated (because overflow interrupt is enabled). The PWMART duty cycle is changed after every "COUNTER" number of overflow cycles. The duty cycle can vary from ~99% to ~1% depending on the sinewave sample values.

In the first step 8.1 the interrupts and overflow flags are cleared. Then the counter value is checked 8.2. If the counter is greater then or equal to the COUNTER value then the counter values is set to zero 8.3 and then checked if the upper half of the sine wave is to be generated 8.4 or lower half. According to the selected half of the cycle, the duty cycle register is loaded by adding or subtracting from the average amplitude 8.5, 8.6. Then the index is incremented by one 8.7. If the index is equal the number of samples in the half 8.8 then the index is set to zero and the polarity of the sine wave cycle is changed 8.9 and then counter value is increased by one 8.10 and the control is returned to main routine.

Figure 9:
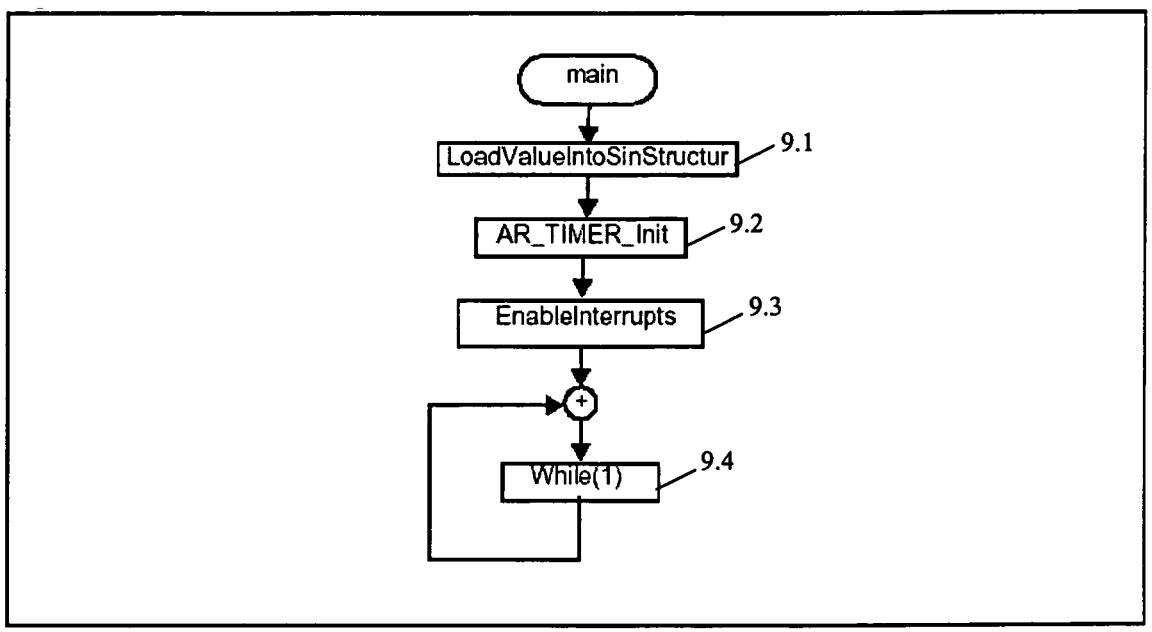
FIG. 9 shows the main routine.

FIG. 9 shows the main routine. In the first 9.1 and second step 9.2 the main routine calls another sub routine LoadValueIntoSinStructur and AR_TIMER_Init.

After this, the initialization interrupts are enabled 9.3 (RIM is executed) so that the microcontroller can go into the interrupt routine when an interrupt comes and an infinite while loop 9.4 is called.

Other modifications and embodiments of the invention are possible and will appear to those skilled in the art from a consideration of the specification and practice of the invention disclosed herein. It is intended that the specification and examples to be considered as exemplary only, with the true scope and spirit of the invention being indicated by the following claims.

That which is claimed is:

1. An improved method for generating variable frequency cyclic waveforms using Pulse Width Modulation (PWM) for providing adjustable precision frequency and enhanced resolution, comprising the steps of:
   (a) providing one or more sets of sinewave frequencies, each set having a first constant, a second constant and a third constant,
   (b) generating a PWM waveform,
   (c) selecting one of said sets having duty cycle values, wherein each duty cycle value has an associated number of samples,
   (d) obtaining the duty cycle value for each cycle of said PWM waveform from the selected set of duty cycles,
   (e) maintaining the duty cycle for a specified number of PWM cycles,
   (f) obtaining next duty cycle from said selected set at the end of said specified number of PWM cycles,
   (g) repeating steps (d), (e) & (f) for the number of samples corresponding to said selected set,
   (h) repeating step (g) to generate multiple waveform cycles,
   (i) selecting a different combination of said first constant and/or said second constant and/or said third constant to achieve a different desired waveform frequency whenever required, and
   (j) filtering the waveform cycles to get a desired output waveform.

2. An improved method as claimed in claim 1 wherein said sets of duty cycle values corresponding to the desired waveform amplitude are provided by means of one or more look up tables.

3. An improved method as claimed in claim 1 wherein said filtering is achieved using a low pass filter.

4. An improved method as claimed in claim 1 wherein said first constant comprises a PWM frequency.

5. An improved method as claimed in claim 1 wherein said second constant contains the number of samples per cycle.

6. An improved method as claimed in claim 1 wherein said third constant contains a counter value showing a number of overflow cycles after which the duty cycle of the PWM waveform is changed.

7. An improved system for generating variable frequency cyclic waveforms using Pulse Width Modulation (PWM) for providing adjustable resolution, comprising:
   a) storage means for storing one or more sets of sinewave frequencies, each set having a first constant, a second constant and a third constant,
   b) a PWM waveform generator for generating a PWM waveform,
   c) selection means for selecting one of said sets of having duty cycles,
   d) means for obtaining the duty cycle of each cycle of said PWM waveform from the selected set of duty cycles, e) means for maintaining the duty cycle for a specified number of PWM cycles, f) means for obtaining next duty cycle from said selected set at the end of said specified number of PWM cycles, g) means for repeating steps d), e) and f) for the number of samples corresponding to said selected act, h) means for continuing step g) to generate multiple waveform cycles, i) selection means for selecting a different combination of said first constant and/or said second constant and/or said third constant to achieve a different desired waveform frequency whenever required, and;

j) a filter to eliminate undesired frequency elements from the generated wave.

8. An improved system as claimed in claim 7 wherein said storage means are a memory device.

9. An improved system as claimed in claim 7 wherein said memory contains one or more lookup tables that store said sets of duty cycle values corresponding to the desired waveform amplitude each set having a corresponding number of samples per cycle.

10. An improved system as claimed in claim 7 wherein said filter element is a low pass filter.

11. An improved system as claimed in claim 7 wherein said first constant comprises a PWM frequency.

12. An improved system as claimed in claim 7 wherein said second constant contains the number of samples per cycle.

13. An improved system as claimed in claim 7 wherein said third constant contains a counter value showing a number of overflow cycles after which the duty cycle of the PWM waveform is changed.

\* \* \* \* \*